United States Patent

Waite

[11] Patent Number: 4,483,653
[45] Date of Patent: Nov. 20, 1984

[54] WHEELCHAIRS

[76] Inventor: Brian Waite, Lower Barn, Bodiam, Robertsbridge, Sussex, England

[21] Appl. No.: 329,110

[22] Filed: Dec. 9, 1981

[51] Int. Cl.³ .................. B60P 1/46; B62M 1/14
[52] U.S. Cl. .................. 414/541; 280/242 WC; 280/647; 414/921
[58] Field of Search .......... 414/541, 542, 543, 921, 414/786; 280/242 WC, 647

[56] References Cited

U.S. PATENT DOCUMENTS 3,515,294  6/1970  Southward et al. ............ 414/541
4,096,955  6/1978  Dake .......................... 414/921 X
4,170,368  10/1979 Southward et al. ........... 414/921 X
4,380,343  4/1983  Lovell et al. ................ 280/242 WC Primary Examiner—Robert G. Sheridan
Attorney, Agent, or Firm—McGlew and Tuttle

[57] ABSTRACT

A mechanism for transferring a wheelchair through a side door opening of a motor vehicle includes a hoisting device disposed in the vehicle and a linkage linking the chair to the hoist. Once hoisted off the ground, the wheels of the chair are retracted and the chair is swung by the parallel links through the door opening. The chair is suspended at a rear corner of a generally box-like frame so that final pivoting of the chair about its point of suspension not only brings the chair to its front facing position in the vehicle but simultaneously completes its sideways movement into the vehicle. The chair is then lowered into its seated position.

7 Claims, 16 Drawing Figures

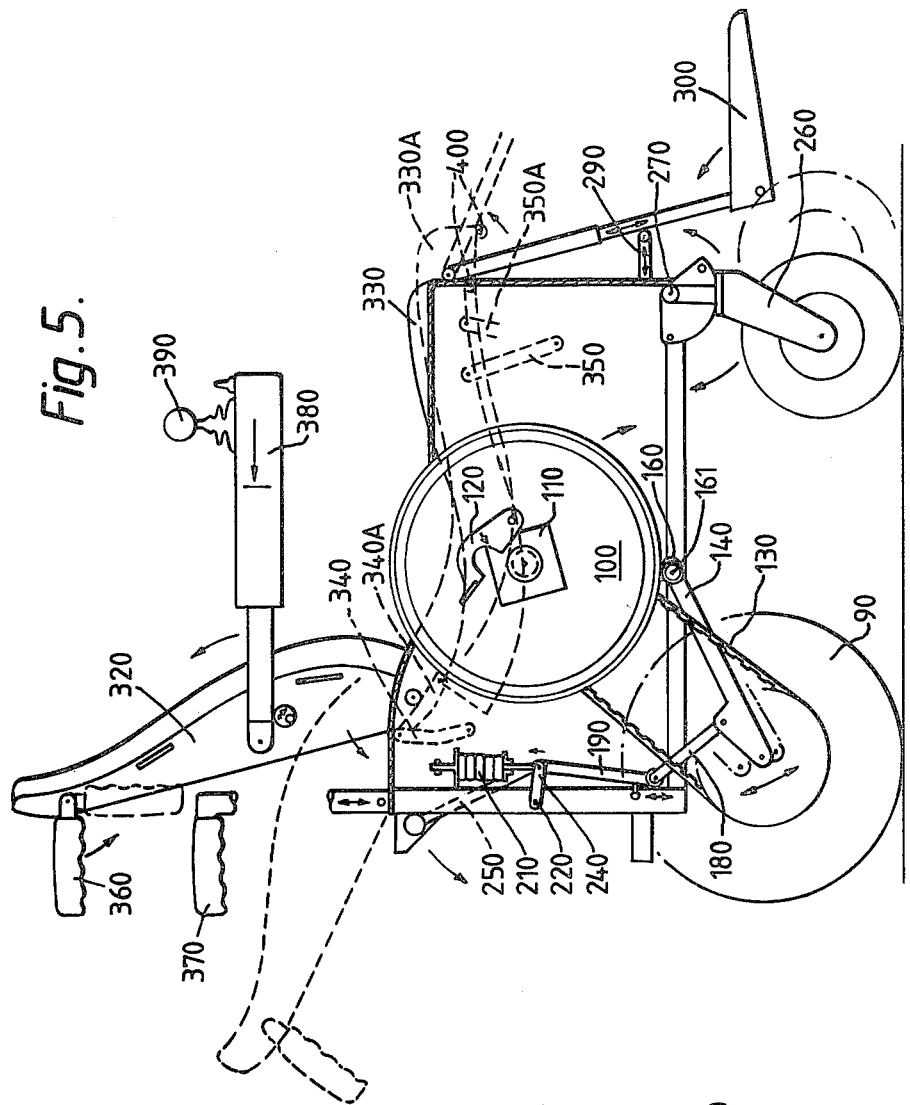
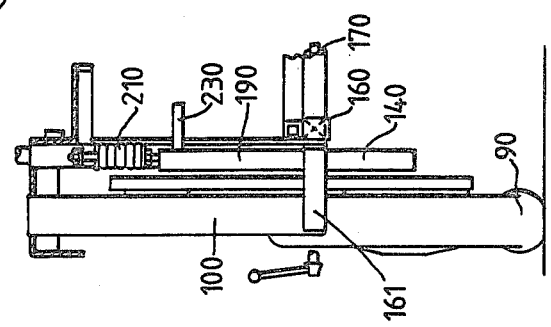

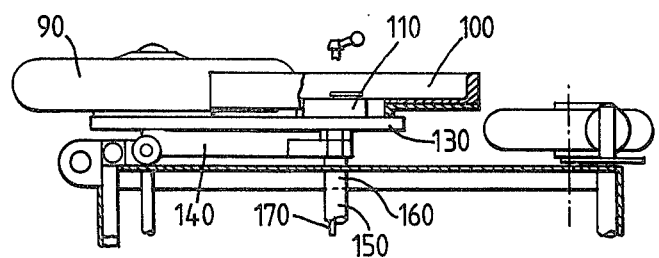
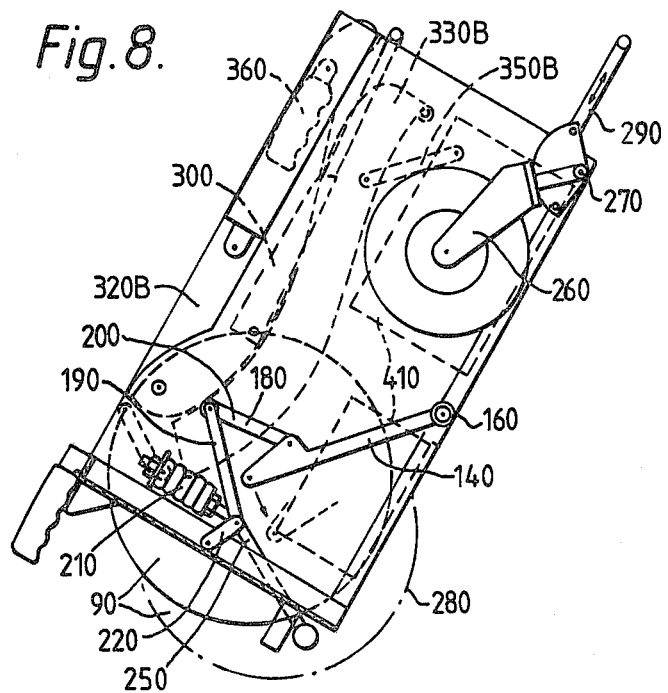

WHEELCHAIRS

FIELD AND BACKGROUND OF THE INVENTION

This invention relates to wheelchairs for handicapped people and, in particular, to the transfer of such wheelchairs into motor vehicles.

Transferring a handicapped person from a wheelchair into a seat of a motor vehicle is frequently a painful and hazardous operation. Vehicles such as vans, small buses, and ambulances are therefore sometimes equipped with taillift mechanisms which enable wheelchairs to be lifted and driven into the back of the vehicle. But such mechanisms are cumbersome and unsuited for use in a normal family-sized car.

In one previous proposal for transferring a wheelchair into a family car, a revolving platform is fitted in the car in place of the normal seat. In use, a ramp is extended from the platform onto the curb or road, and the wheelchair is manoeuvered up the ramp onto the platform. The platform is then revolved to bring the wheelchair to its front-facing position. This mechanism requires a wheelchair which can be adjusted to reduce its height for positioning in the car. Once inside the car, the wheelchair is locked in position and is intended to be used as a driving seat if required.

An advantage of this prior proposal is that the wheelchair occupant can enter or leave the car without having to get out of the wheelchair. On the other hand, the mechanism is complicated and, with the variation in seating layout and size of doorways, it is unlikely that the unit could be fitted in a wide range of cars unless it were separately designed for each car model. Moreover, since the ramp angle would be steep when entry was from the road rather than from the curb, the mechanism would need to be powered externally for many wheelchair occupants who would lack the strength to push themselves up the ramp.

Another prior proposal is described in British patent No. 1,226,402. In this system an invalid chair is lifted from a wheeled base by a hoisting mechanism fixed in the vehicle, it is then swung about a vertical axis of the hoist mechanism so that the chair passes through the door opening, and finally it is lowered into position within the vehicle. The chair is connected to the hoist mechanism by a linkage consisting of upper and lower pairs of arcuate arms, the two upper arms and the two lower arms each being joined at a central pintle, and the arms being locked from pivoting on the central pintles by a rigid stay spanning the two upper arms. The jointed arms in such a mechanism make it difficult to control, the chair being spaced from the hoist mechanism by the length of the double arm linkage until it reaches the door opening, and the linkage then being folded to allow entry of the chair into the vehicle. A further disadvantage is that, whenever the vehicle arrives at its destination, there must be a wheeled base available if the wheelchair occupant is to be able to leave the vehicle.

SUMMARY OF THE INVENTION

In accordance with one aspect of the present invention there is provided a method of transferring a wheelchair through a door opening into a motor vehicle, the method comprising reversing the chair up to the door opening, hoisting the chair off the ground, swinging the suspended chair about at least one vertical axis fixed in the vehicle such that a rear portion of the chair is transferred laterally through the door opening, pivoting the chair about its point of suspension to complete the lateral movement into the vehicle and to bring the chair to its front-facing position, and then lowering the chair into its seated position.

The chair is preferably swung about two closely spaced, generally vertical axes, and the point of suspension preferably lies at or near a rear corner of a generally rectangular frame of the chair so that the lateral movement produced by the pivoting of the chair into its front facing position is very nearly equal to the full width of the chair.

Such a mechanism operates with two distinct and easily controllable movements in which the chair follows a predetermined path, and is therefore well suited for motor powered operation. This contrasts with the type of mechanism described in the aforesaid U.S. Pat. No. 1,226,402 which would necessarily require manual operation because the chair does not follow a predetermined path when the jointed arms are released and folded to permit entry of the chair through the door opening.

A linkage between the hoist mechanism and the wheelchair preferably comprises a substantially parallel arm linkage, the inner ends of the arms being pivoted to the hoist mechanism and the outer ends being pivotally connected to a transfer arm on which the wheelchair is pivotably mounted.

In accordance with another aspect of the present invention, a wheelchair for handicapped or elderly persons comprises a generally rectangular box-like frame and a seat supported by the frame, the frame being supported on at least three wheels when resting on the ground and each of the wheels being retractable with respect to the frame when the wheelchair is lifted off the ground whereby the suspended wheelchair may be transferred through a door opening in a motor vehicle.

In one embodiment of the invention, the retraction mechanism swings at least each rear wheel about an axis spaced from and inclined to the axis of the wheel whereby in their lowered, extended positions the two wheels are substantially vertical while in their retracted positions the two wheels converge downwards toward one another. This reduces the track width at the base of the wheelchair when the wheels are retracted and thereby assists in locating the chair between the door sill and the transmission tunnel of a motor vehicle without reducing the width of the seat.

The axis spaced from the wheel axis is preferably substantially horizontal but inclined rearwardly with respect to the frame. The wheels therefore converge rearwardly as well as downwards when in their retracted positions. In this manner the retracted wheels are less likely to impede movement of the wheelchair occupant.

In accordance with a further aspect of the present invention there is provided a wheelchair comprising a generally rectangular frame supported on at least three wheels, a seat supported by the frame and movable between a forward position and rearward position, a backrest for the seat movable between an upright position and a reclining position, and means co-ordinating the movements of the backrest and the seat whereby movement of the backrest from its upright position to its reclining position is associated with a corresponding movement of the seat from its rearward position to its forward position.

BRIEF DESCRIPTION OF THE DRAWINGS

By way of example only, an embodiment of the invention will now be described with reference to the accompanying drawings in which:

FIG. 5 is a side view of a self-propelled wheelchair embodying the invention, FIG. 6 is a front view of a portion of the chair shown in FIG. 5 and showing the rear suspension, FIG. 7 is a plan view of the portion of the chair shown in FIG. 6, FIG. 8 is a side view of the chair of FIG. 5 shown in its folded configuration.

DESCRIPTION OF THE PREFERRED EMBODIMENTS

Figure 1:
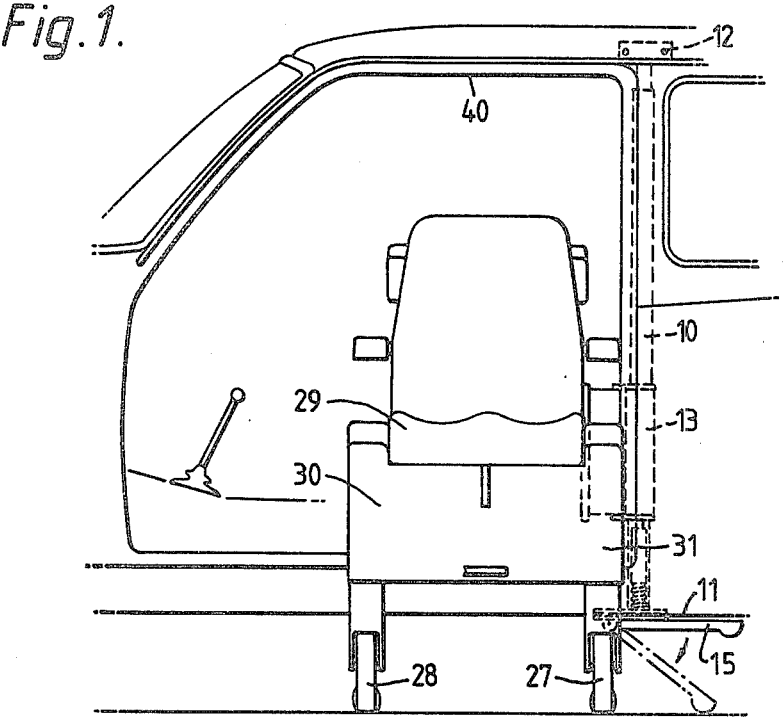
FIG. 1 is a side view of a motor car showing a wheelchair ready for transfer into the car.
Figure 2:
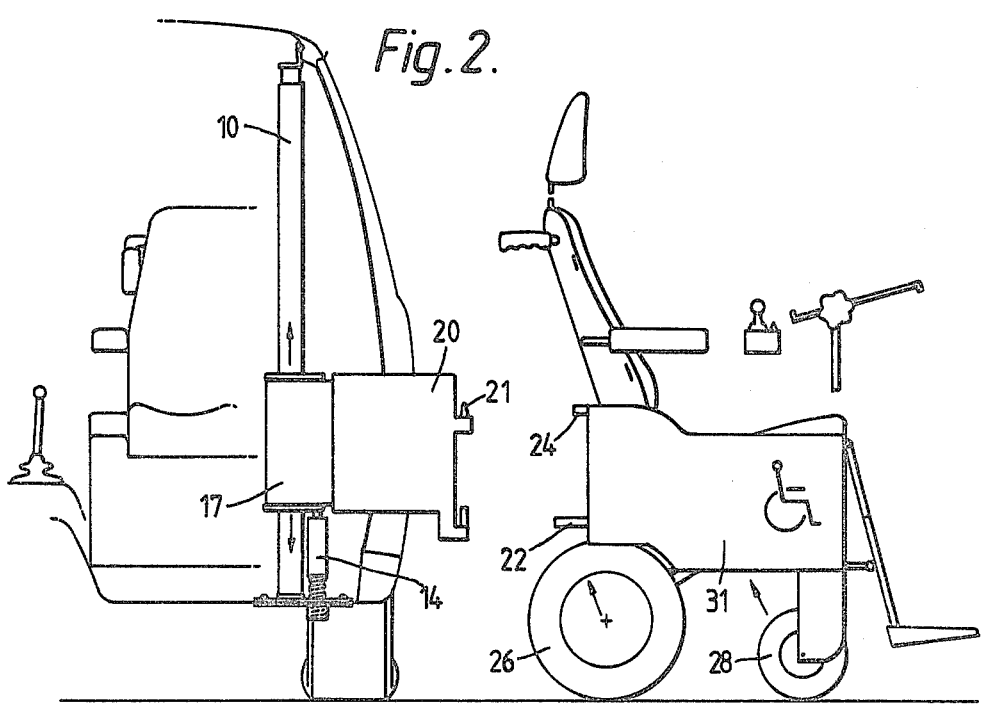
FIG. 2 is a diagrammatic side view of the wheelchair and the transfer mechanism.

As illustrated in FIGS. 1 to 4, the transfer mechanism includes a lifting device and a swivel linkage. The wheelchair is constructed so that it has sufficient strength to be lifted, complete with the occupant, from either flat ground or curbing, by the lifting device which is fixed in the car. The lifting device and linkage lift and transfer the wheelchair, complete with its occupant, through the doorway of any small car or van, and then lower and lock the wheelchair into the normal seating position, and vice versa.

The lifting device includes a vertical, square-section tube 10 fixed to the floor 11 and to the top rail 12 of the car. The tube 10 is located just to the rear of the proposed seat position but, alternatively, may lie adjacent the front door post.

Slidably mounted on the tube 10 is a sleeve 13 which is slightly larger than the tube 10 and slides up and down on roller bearings. The sleeve 13 carries the linkage mechanism, and is operated by mechanical, electrical, hydraulic, or pneumatic jack means 14.

If a hydraulic or pneumatic jack is used for lifting the sleeve 13, initial actuation of the jack lowers a stabilizing foot 15 between the floor of the car and the ground so that any sag of the car suspension when lifting the chair is eliminated.

Figure 13:
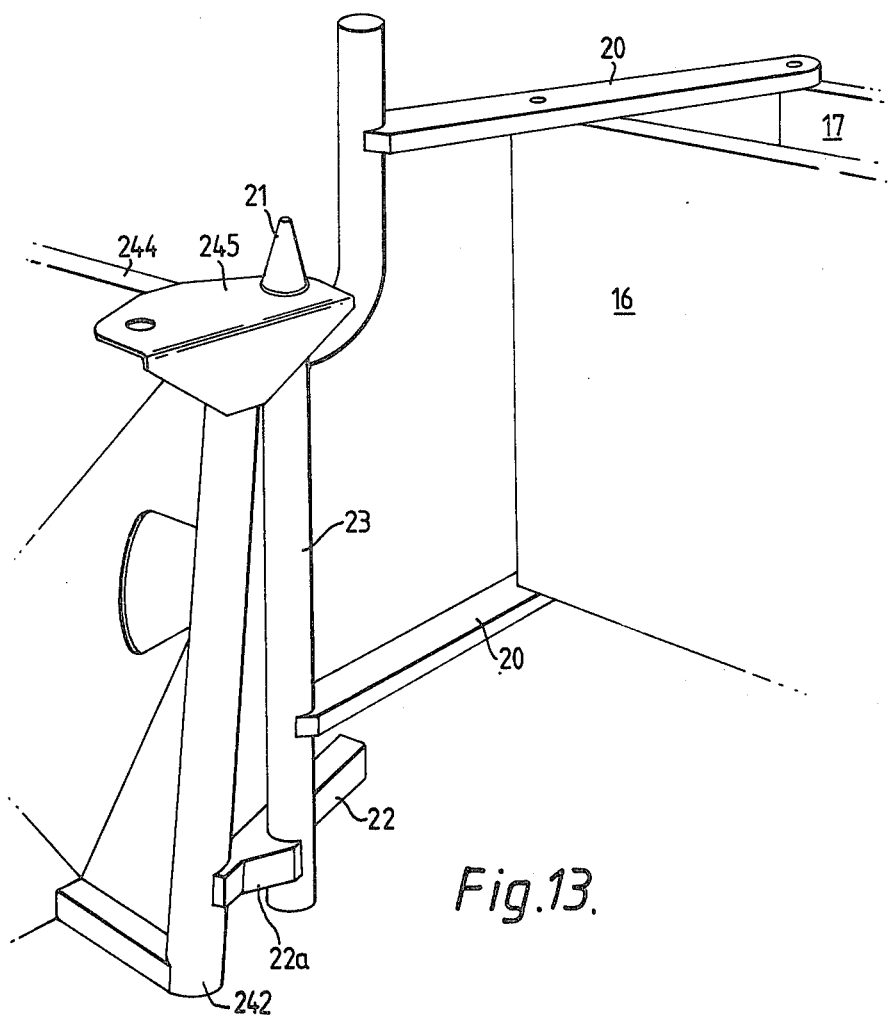
FIG. 13 is a detail of the transfer mechanism shown in FIGS. 1 to 4.

The linkage mechanism consists of two generally vertical plates 16 and 17 hinged on both vertical edges. In practice the plates may be inclined at about 6° to the vertical to compensate for both road camber and the lean of the vehicle due to the offset weight of the chair and occupant during a transfer operation. The rear, or inner, edges are pivoted on fixed plates 18 and 19 projecting from the top and bottom of sleeve 13, and the front, or outer, edges are pivoted onto a transfer plate 20 (or a pair of transfer arms) carrying a vertical conical pin 21 which locates in a hole 24 formed in a bracket 245 secured at a top rear corner of a tubular rear frame 242 of the wheelchair. This is shown most clearly in the detail of FIG. 13.

The pin 21 comprises the machined end of a guide rod 23, and a foot lever 22 secured to the bottom of the frame 242 includes a recessed portion 22a for engaging the guide rod 23. This arrangement allows the chair to be attached to the hoist mechanism even though the chair may be resting on a camber of up to 15°.

Figure 3:
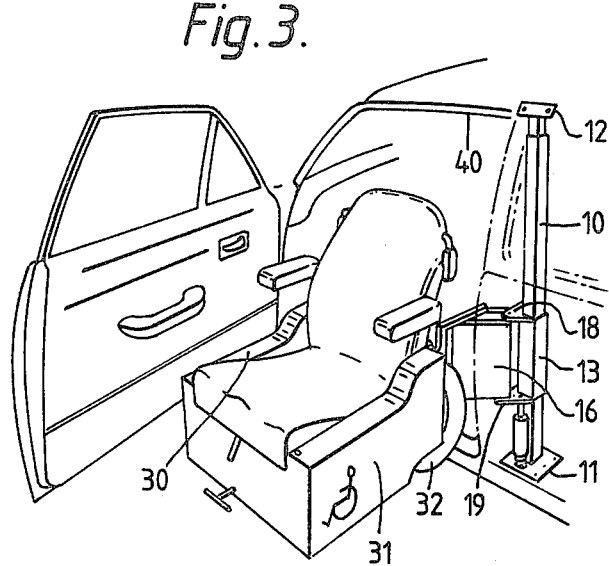
FIG. 3 is a perspective view of the wheelchair and transfer mechanism.
Figure 4:
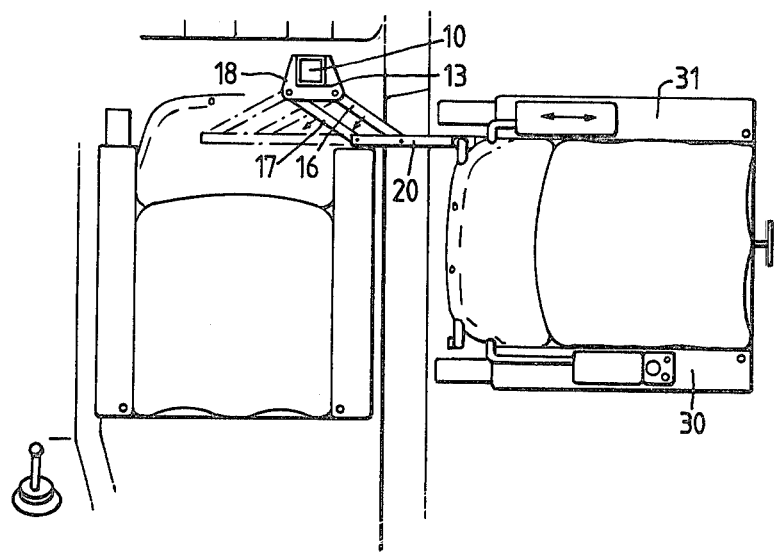
FIG. 4 is a plan view of the wheelchair and transfer mechanism.

In operation, the wheelchair is reversed up to the open doorway of the car. With the sleeve 13 in its lowered position and the linkage arms 16, 17 in their extended position as shown in FIG. 4, the chair is aligned so that, when the outer tube 13 is raised, the conical pin 21 locates in the bearing 24 at the top rear corner of the chair frame. Further operation of the lifting device then lifts the chair off the ground and, as soon as it is high enough, the wheels 26, 27 and 28 are retracted into the frame (as shown in FIG. 3). The chair is then free to be transferred to the car.

The vertical plates 16, 17 are then swung through a small arc to their retracted position shown in dashed outline in FIG. 4, and this draws the chair laterally part-way into the vehicle while the occupant remains facing outwards with his back to the door opening. The chair is then rotated about the pivot 21 to face the front of the vehicle. Since the chair is suspended at a rear corner of its frame, this final pivoting of the chair simultaneously transfers the chair sideways by an amount almost equal to the full width of the chair and thereby completes its lateral transfer into the vehicle.

The chair is then lowered until it rests on a frame secured to the floor of the car, and it is releasably locked in this position by any convenient locking mechanism. The whole transfer process, if required, can be powered.

One advantage of the arrangement is that the occupant does not have to double-up to pass beneath the car's gutter 40 during the transfer process. During rotation of the chair about the pivot 21, the occupant may lean outwards to keep his head clear of the gutter 40, and he can then wait until the chair has been lowered before bringing his head inside the vehicle.

The method of transfer requires a very strong wheelchair. To achieve this, the structure of the chair may be a metal or fibreglass monocoque with a box-like tubular sub-frame.

In the embodiment of FIG. 1 to 8, the four wheels 26, 27, 28 and 32 are retracted into the frame alongside the seat 29 of the wheelchair and into the respective hollow arms 30 and 31. This reduces the overall height of the chair and so allows it to be transferred with its occupant through the average side door opening of a car.

The wheelchair does not fold in the normal way (sides together) but is constructed so that the back folds forward. This, together with the retractable wheels, enables folding of the chair to a compact size considerably smaller than that achieved by normal collapsible chairs.

The wheelchair may be attendant, self or electrically propelled. In the self-propelled model, a 'capstan' wheel is provided which can be of varying sizes but will be situated alongside the occupant and will be connected to the road wheels via a chain or belt. The capstan wheel 100 is illustrated diagrammatically in FIG. 5. The capstan wheel is easily changeable allowing for the provision of varying surface textures and/or shapes, and varying gear ratios for differing disabilities and strengths of the wheelchair occupant. Not only does this enable the disabled person to choose a wheel particularly suitable for his handicap but, because the capstan wheel is well away from the road wheels, it is in all cases cleaner for hands and clothing than the usual method of self-propulsion (another handwheel of slightly smaller diameter and just outside the road wheel).

In general, the described chair is far stronger and safer than collapsible wheelchairs at present available. The described transfer process enables the seat to be swung into a position behind the steering wheel of a car. Unlike the previously described proposal using a ramp and revolving platform, this can be done without requiring any modification to the steering column.

With particular reference now to the self-propelled wheelchair shown in FIGS. 5 to 8, the wheelchair is provided with a 'capstan' 100. The capstan is shown with a smooth latex rim but this can have any contour or texture; it is located on a square drive-peg 110 and retained by a clip 120. The drive-pegs are connected to the rear road wheels via a chain or toothed belt 130.

The rear wheels 90 are mounted on swing-arms 140 which rotate about respective stub axles 161 on bearings 160 and which are split and spigotted to allow independent action, with a brake-rod 170 running down a hollow axis tube 150. Connected to the swing-arms 140 are links 180 each with rollers at their opposite ends, which in turn are connected to links 190. Links 180, 190 adopt an over-centre configuration which retain the links in their extended positions and prevent premature folding until there is no weight on the wheels i.e. when the chair is off the ground. Link 190 acts on rubber suspension spring 210 under the control of arm 220. A rod 230 secured to links 190 connects left-hand and right-hand suspensions and has an angular joint 240 because of the independent action of both rear wheels 90.

Solidly fixed to rod 230 is lever 250 which operates the folding mechanism for the rear wheels. Downward rotation of lever 250 from its position shown in FIG. 5 to its position shown in FIG. 8 rotates each link 190 about its pivotal connection with a wishbone link 220 so that the links 190, 180 and 140 are moved from their extended positions shown in FIG. 5 to the positions shown in FIG. 8.

The 'capstan' 100 may be easily removed to assist side exit and for folding, hence the quick-release catch 120. The front castors 260 retract by simply rotating in either direction about axis 270. When the chair is folded into its "shopping-trolley" configuration (FIG. 8), the rear wheels can be set down to position 280 allowing the unit to be pulled along by extending handle 290 which also acts as the adjustment for the foot-rest 300.

The back of the wheelchair may be lowered to a reclining position as shown by the dashed outline in FIG. 5 while retaining its stability. Stability is maintained because the seat portion moves forward as the back lowers to the reclining position, so keeping the centre of gravity in approximately the same place i.e. within a short wheel base, and thus providing the advantages of a recliner without the usual disadvantage of loss of maneuvrability due to a long wheelbase.

Figure 14:
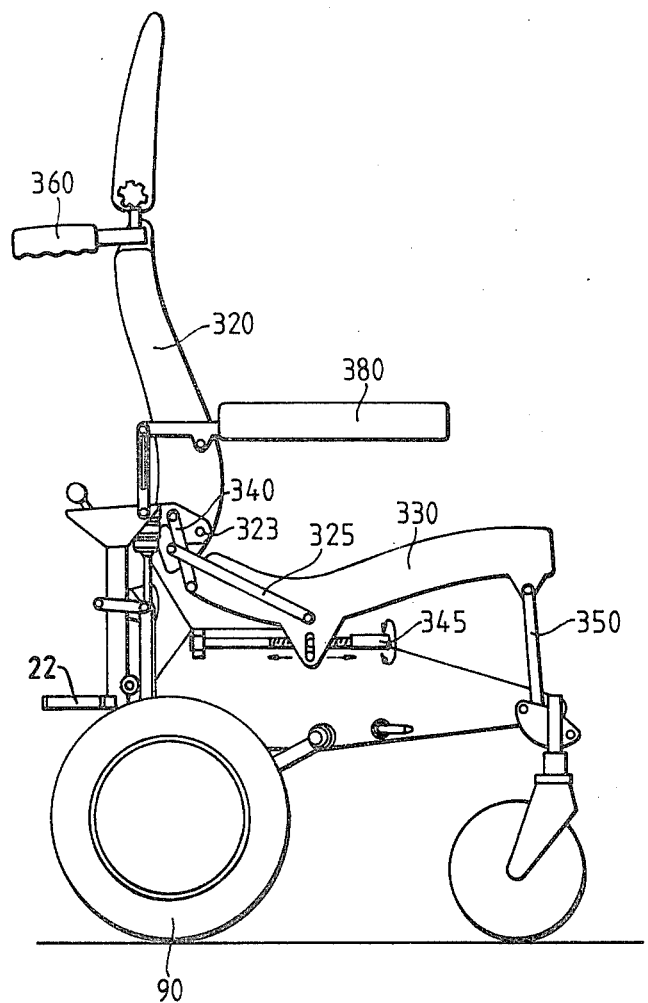
FIG. 14 is a diagrammatic side view of the chair shown in FIG. 5 and illustrating the seat folding mechanism with the backrest in its upright position.
Figure 15:
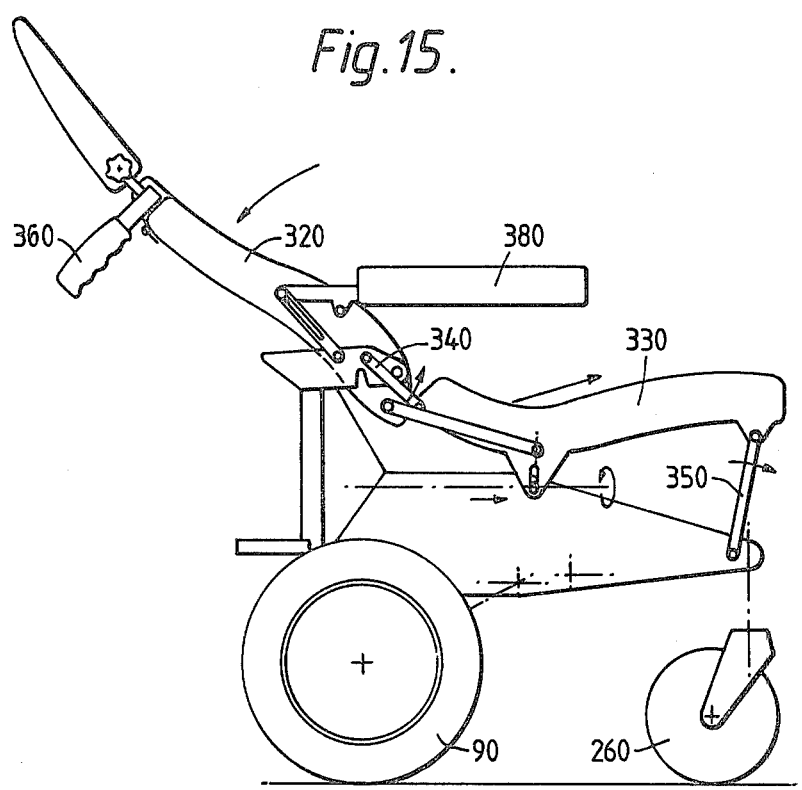
FIG. 15 is a view similar to that of FIG. 14 showing the backrest in its reclining position, and, FIG. 16 is a view similar to that of FIG. 14 showing the chair in its collapsed, folded configuration.
Figure 16:
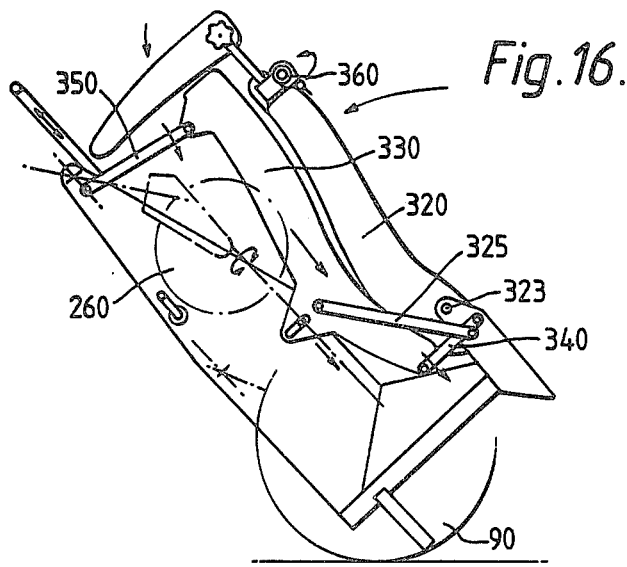

With additional reference to FIGS. 14 to 16, the rigid, contoured back-rest 320 can recline (FIG. 15) or fold forward (FIG. 16). In FIGS. 5 and 8 the alternative positions are shown in dotted outline and denoted by the suffixes A (reclining) and B (folded) against the reference numerals. Rotation of screw 345 (FIG. 14) by manual or electric means moves the seat squab 330 forward or backwards according to the direction of rotation. The position of the squab 330 is controlled by a pair of links 340 (one on each side) at the rear, and by a pair of links 350 (one on each side) at the front. The back-rest 320 is pivoted to the frame at 323 and is connected to the seat squab 330 by a pair of connecting links 325 (one on each side). Accordingly, forward movement of the seat squab 330 is accompanied by movement of the backrest to its reclining position shown in FIG. 15. The forward movement of the seat squab compensates for the rearward movement of the centre of gravity of the occupant as the occupant reclines so that the centre of gravity is kept virtually stationary within the short wheelbase. The short wheelbase is necessary for maneuvrability.

The forward movement of seat squab 330 can, if required, also elevate footrest 300 by means of a pin 400 as shown diagrammatically in FIG. 5. When folding into the configuration of FIG. 8 or FIG. 16 the footrest 300 (not shown in FIG. 16) is contained in the hollow between the seat back 320B and the seat squab 330B.

For folding and for when the seat is fixed in a motor vehicle, the handles 360 fold down (a safety measure); an alternative handle 370 is shown in FIG. 5 which has greater height adjustment and would allow the occupant to be pushed whilst in the semi-reclining position. Arms 380 can be flipped over for easy side exit and adjusted for length and angle. Also shown in FIG. 5 is a control lever 390 for an electric chair; FIG. 8 shows, in dotted lines, the positions of two dry-cell batteries 410.

The main advantage of providing front to back folding rather than the side folding of conventional wheelchairs is that a rigid ergonomically designed backrest and seat squab can be used to give adequate support to the occupant. Since the occupant may have to spend up to 16 hours per day in the one seat, and may not have the feeling to tell him of the discomfort that leads to many physical problems, this can be of immense benefit.

Referring now to FIGS. 9 to 12, a modified wheel retraction mechanism is illustrated in which the rear wheels 90 are no longer maintained in a vertical plane when retracted. FIGS. 9 to 12 also illustrate the basic retraction mechanism of FIGS. 5 to 8 in more detail and like reference numerals denote like parts in the two sets of figures.

A rear tubular frame 242 and front castor axle housing 243 are welded to a sheet metal structure 244 to form a complete chassis or "box-like" frame. The weight of the chair is transmitted to the wheels from top rear bracket 245 of the frame via rubber suspension springs 210 held on vertical rods 246. Movement of rods 246 is controlled by a wishbone link 220 via pivot axis 241 at the bottom and by a hole in the top bracket 245 at the top. The hole in the top bracket allows up and down movement of the vertical rod through the bracket as the suspension moves. The wishbone links 220 have their fulcrum at a bearing 247 which is welded to the rear of the rear tubular frame 242. This gives more length to the wishbone 220 compared to the arrangement shown in FIGS. 5 to 8, and therefore reduces its angular movement during suspension travel. The load is transferred to rear wheels 90 through pivot 241, link 190, link 180, and swing axle 140.

The rear wheels 90 normally rotate about a substantially horizontal axis 91, each wheel being mounted for rotation about an axle 92 at one end of the swing link arm 140 as in the mechanism of FIGS. 5 to 8. In FIGS. 9 to 12, however, the arms 140 rotate about stub axles 93 inclined rearwardly with respect to the side members 94, 95 of the sheet metal structure 244 at an angle $\theta$ to the central axis 96 in the plan view of FIG. 11.

Figure 9:
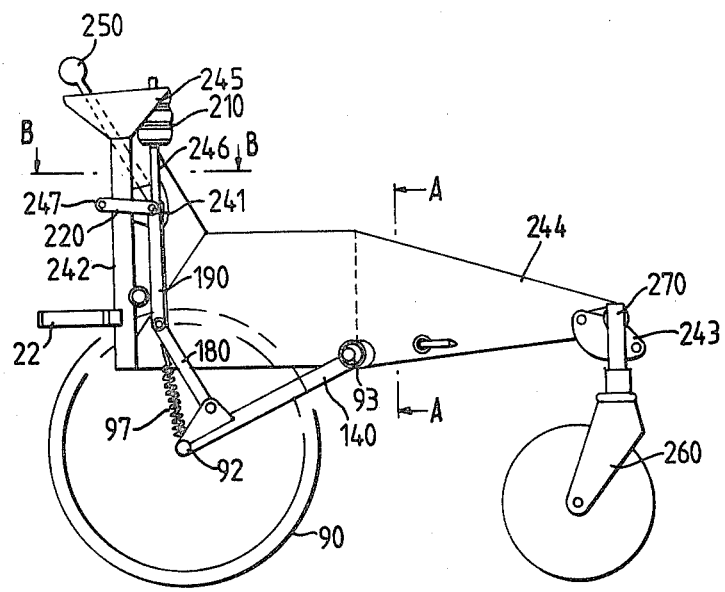
FIG. 9 is a side view of an alternative rear wheel retracting mechanism showing the rear wheels down.
Figure 10:
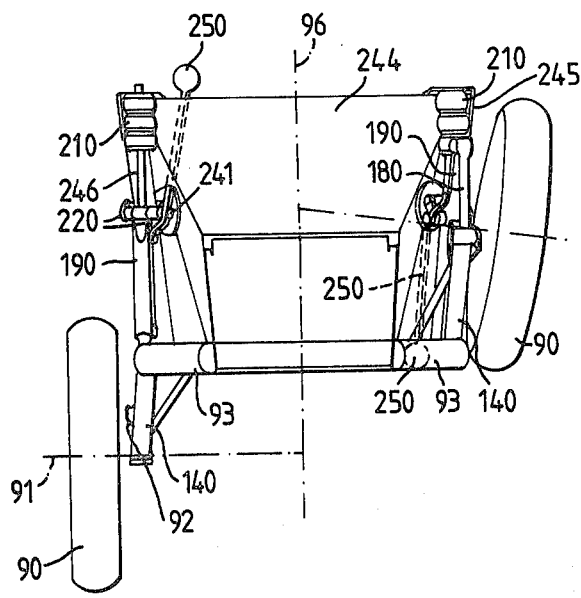
FIG. 10 is a front elevation on line A—A of FIG. 9 showing one rear wheel down and the other retracted.
Figure 11:
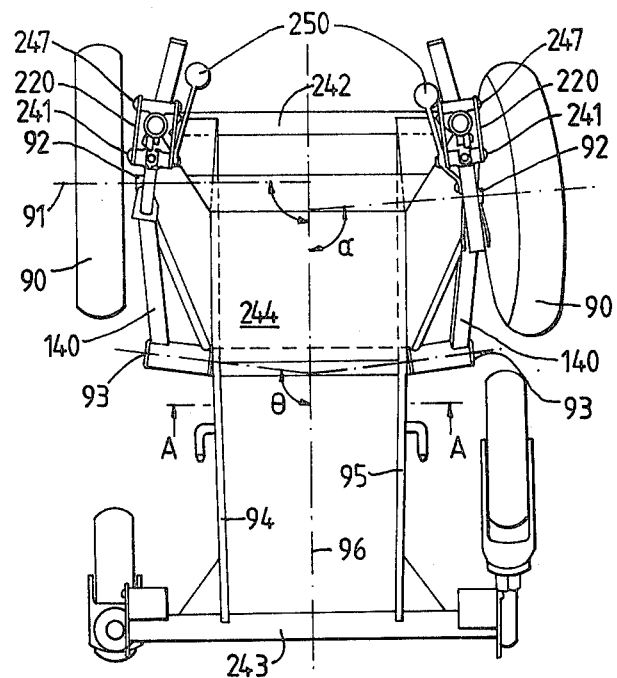
FIG. 11 is a plan view on line B—B of FIG. 9 showing the left hand set of wheels up or retracted and the right hand wheels down or extended (as viewed by the wheelchair occupant)
Figure 12:
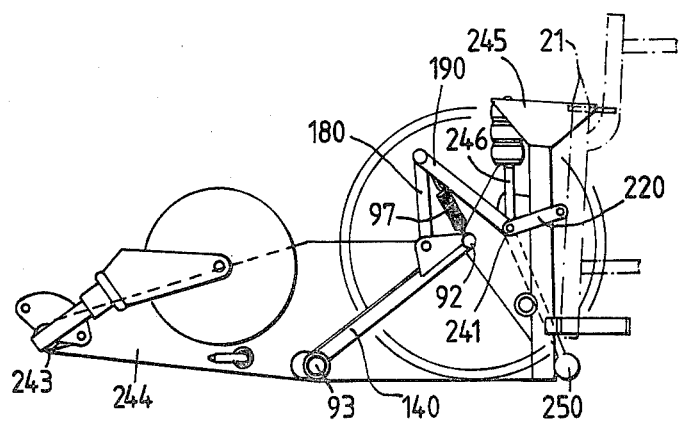
FIG. 12 is a side view similar to that of FIG. 9 but showing the wheels retracted.

Accordingly, when lever 250 is pulled down and the links 140, 180 and 190 are moved from their extended configuration of FIG. 9 to their retracted FIG. 12 configuration, the axles of the wheels 90 will no longer be horizontal and the wheels will converge downwardly toward one another as shown on the right hand side of FIG. 10.

The angle of each axle 92 with respect to the axis 96 changes in both plan and rearward elevations. The change for the rearward elevation is illustrated on the right hand side of FIG. 11 and shows that the wheels 90 are toed-out at an angle $\alpha$ when the wheels are retracted.

This downward convergence and toeing-out of the retracted rear wheels allows the chair to fit more easily between the door sill and the central transmission tunnel of a motor vehicle without reducing the width of the seat, and without the top of each wheel impeding the thighs of an occupant seated in the chair. In FIGS. 9 to 12 each rear wheel 90 is independently retractable by operating a respective lever 250, each wheel having its own set of links 140, 180 and 190. The links 190 and 180 are retained in their over-centre position by means of a spring 97 when the wheels are down. The lever 250 is secured to the link 190 as shown most clearly on the left hand side of FIG. 10 so that downward movement of lever 250 about pivot 241 at the end of link 220 urges link 190 against the bias of spring 97 out of its over-centre relationship with link 180 and carries the links to the position shown in FIG. 12.

I claim:

1. A motor vehicle fitted with a mechanism for transferring a wheelchair through a side door opening of the vehicle, the mechanism comprising a hoist mechanism mounted in the vehicle adjacent the side door opening, and a linkage for linking the wheelchair frame to the hoist mechanism, the linkage including an outer pivot for mounting the wheelchair frame and means constraining the pivot to follow a fixed predetermined path generally transverse to the door opening while moving from an extended position disposed outside the vehicle to a retracted position disposed within the vehicle whereby transfer of the wheelchair into the vehicle is completed by pivoting the frame about the pivot, the hoist mechanism including a hoist member slidably and non-rotatably mounted on an upright support member, the linkage including an inner pair of parallel links pivoted on the hoist member for rotation about respective generally vertical axes, the outer ends of the inner pair of links being pivotally connected to spaced apart points along a third link, and the wheelchair being pivotally mounted at the outer end of the third link.

2. A vehicle according to claim 1, further comprising powered drive means for raising and lowering the hoist member.

3. A motor vehicle fitted with a mechanism for transferring a wheelchair through a side door opening of the vehicle, the mechanism comprising a hoist mechanism mounted in the vehicle adjacent the side door opening, and a linkage for linking the wheelchair frame to the hoist mechanism, the linkage including an outer pivot for mounting the wheelchair frame and means constraining the pivot to follow a fixed predetermined path generally transverse to the door opening while moving from an extended position disposed outside the vehicle to a retracted position disposed within the vehicle whereby transfer of the wheelchair into the vehicle is completed by pivoting the frame about the pivot, the hoist mechanism including a hoist member slidably and non-rotatably mounted on an upright support member, powered drive means for raising and lowering the hoist member, and the linkage including a pair of parallel links, the outer ends of the parallel links being pivotally connected to spaced points along a third link and the inner ends of the parallel links being pivotally connected to the hoist member for rotation about respective generally vertical axes.

4. A vehicle according to claim 3, wherein the pivot is at the furthest near a corner of the wheelchair frame.

5. In combination, a wheelchair comprising a generally rectangular box-like frame and a mechanism for transferring the frame through a side door opening into a motor vehicle, the transfer mechanism including a hoisting device comprising a generally vertical support member which, in use, is mounted in the vehicle adjacent the opening, a hoist member slidably and non-rotatably mounted on the support member, and a linkage for linking the wheelchair frame to the hoist member, the linkage including an outer pivot from which the wheelchair frame is pivotally suspended during transfer into the vehicle and means constraining the pivot to follow a predetermined path generally transverse to the door opening while moving from an extended position disposed outside the vehicle to a retracted position disposed within the vehicle whereby transfer of the wheelchair frame into the vehicle is completed by a pivotal movement of the frame about the pivot, the linkage including a pair of substantially parallel links, the outer ends of the parallel links being pivotally connected to spaced points along a third link and the inner ends of the parallel links being pivotally connected to the hoist member for rotation about respective generally verical axes.

6. The combination of claim 5, in which the pivot is at or near a rear corner of the frame.

7. A combination according to claim 5, in which the wheels of the chair are retractable when the chair is suspended from the linkage.

* * * * *